United States Patent
Yang et al.

(10) Patent No.: US 12,265,733 B2
(45) Date of Patent: Apr. 1, 2025

(54) SEGREGATING LARGE DATA BLOCKS FOR DATA STORAGE SYSTEM

(71) Applicant: Western Digital Technologies, Inc., San Jose, CA (US)

(72) Inventors: Niles Yang, Mountain View, CA (US); Daniel J. Linnen, Limestone, TN (US); Judah Gamliel Hahn, Ofra (IL)

(73) Assignee: Sandisk Technologies, Inc., Milpitas, CA (US)

( * ) Notice: Subject to any disclaimer, the term of this patent is extended or adjusted under 35 U.S.C. 154(b) by 8 days.

(21) Appl. No.: 18/449,428

(22) Filed: Aug. 14, 2023

(65) Prior Publication Data

US 2024/0192886 A1    Jun. 13, 2024

Related U.S. Application Data

(60) Provisional application No. 63/386,938, filed on Dec. 12, 2022.

(51) Int. Cl.
*G06F 3/06* (2006.01)

(52) U.S. Cl.
CPC ............ *G06F 3/0658* (2013.01); *G06F 3/064* (2013.01); *G06F 3/0683* (2013.01); *G06F 3/0604* (2013.01)

(58) Field of Classification Search
CPC ...... G06F 3/0658; G06F 3/064; G06F 3/0683; G06F 3/0604
See application file for complete search history.

(56) References Cited

U.S. PATENT DOCUMENTS

| | | |
|---|---|---|
| 10,101,909 B2 | 10/2018 | Song |
| 10,223,022 B2 | 3/2019 | Syu et al. |
| 10,762,000 B2 | 9/2020 | Chang et al. |
| 10,776,049 B2 | 9/2020 | Kim |
| 2015/0169228 A1* | 6/2015 | Sivasankaran ........ G06F 3/0659 711/103 |
| 2015/0347026 A1 | 12/2015 | Thomas |

(Continued)

OTHER PUBLICATIONS

Kim et al. "Improving Performance and Lifetime of Large-Page NAND Storages Using Erase-Free Subpage Programming," DAC '17: Proceedings of the 54th Annual Design Automation Conference 2017, Jun. 2017, Article No. 24, pp. 1-6.

*Primary Examiner* — Ryan Bertram
(74) *Attorney, Agent, or Firm* — Michael Best & Friedrich LLP

(57) ABSTRACT

Methods and apparatus for efficiently handling large data files and their updates in NAND memory. In one example, provided is a data-storage system configured to reduce the frequency of data relocations by segregating a large data file into a plurality of subfiles. The size of such subfiles is appropriately selected to reduce the probability of occurrence for host-relocation conflicts and the magnitude of write amplification, thereby enabling the data-storage system to provide better quality of service while substantially maintaining acceptable levels of other pertinent performance characteristics. In some examples, a sequence of host read-modify-write commands is handled by generating a copy of implicated subfiles in a data buffer, applying subfile updates to the copy in the data buffer in accordance with the sequence, and relocating the implicated subfiles in the NAND memory using the updated versions thereof from the data buffer.

17 Claims, 14 Drawing Sheets

(56) References Cited

U.S. PATENT DOCUMENTS

| | | | |
|---|---|---|---|
| 2017/0109371 A1* | 4/2017 | Zheng | G06F 16/183 |
| 2018/0121135 A1* | 5/2018 | Lee | G06F 3/067 |
| 2018/0267706 A1 | 9/2018 | Li et al. | |
| 2018/0321874 A1 | 11/2018 | Li et al. | |
| 2019/0056866 A1* | 2/2019 | Kang | G06F 3/061 |
| 2019/0272118 A1 | 9/2019 | Jin | |
| 2020/0233610 A1 | 7/2020 | Sun et al. | |
| 2021/0064292 A1* | 3/2021 | Choi | G06F 3/064 |
| 2024/0103739 A1* | 3/2024 | SeyedzadehDelcheh | G11C 16/08 |

* cited by examiner

| Meta Block 200 | Channel 0 | | | | | | | | Channel 1 | | | | | | | | Channel 2 | | | | | | | | Channel 3 | | | |
|---|---|---|---|---|---|---|---|---|---|---|---|---|---|---|---|---|---|---|---|---|---|---|---|---|---|---|---|---|
| | Die 0 | | | | | | | | Die 0 | | | | | | | | Die 0 | | | | | | | | Die 0 | | | |
| | Logical Die 0 | | | | | | | | Logical Die 1 | | | | | | | | Logical Die 2 | | | | | | | | Logical Die 3 | | | |
| Wordline | Plane 0 | Plane 1 | Plane 2 | Plane 3 | Plane 0 | Plane 1 | Plane 2 | Plane 3 | Plane 0 | Plane 1 | Plane 2 | Plane 3 | Plane 0 | Plane 1 | Plane 2 | Plane 3 | Plane 0 | Plane 1 | Plane 2 | Plane 3 | Plane 0 | Plane 1 | Plane 2 | Plane 3 | Plane 0 | Plane 1 | Plane 2 | Plane 3 |
| 0 | | | | | | | | | | | | | | | | | | | | | | | | | | | | |
| 1 | | | | | | | | | | | | | | | | | | | | | | | | | | | | |
| 2 | | | | | | | | | | | | | | | | | | | | | | | | | | | | |
| 3 | | | | | | | | | | | | | | | | | | | | | | | | | | | | |
| 4 | | | | | | | | | | | | | | | | | | | | | | | | | | | | |
| 5 | | | | | | | | | | | | | | | | | | | | | | | | | | | | |
| 6 | | | | | | | | | | | | | | | | | | | | | | | | | | | | |
| 7 | | | | | | | | | | | | | | | | | | | | | | | | | | | | |
| 8 | | | | | | | | | | | | | | | | | | | | | | | | | | | | |
| 9 | | | | | | | | | | | | | | | | | | | | | | | | | | | | |
| 10 | | | | | | | | | | | | | | | | | | | | | | | | | | | | |
| 11 | | | | | | | | | | | | | | | | | | | | | | | | | | | | |
| 12 | | | | | | | | | | | | | | | | | | | | | | | | | | | | |
| 13 | | | | | | | | | | | | | | | | | | | | | | | | | | | | |
| 14 | | | | | | | | | | | | | | | | | | | | | | | | | | | | |
| 15 | | | | | | | | | | | | | | | | | | | | | | | | | | | | |
| 16 | | | | | | | | | | | | | | | | | | | | | | | | | | | | |
| 17 | | | | | | | | | | | | | | | | | | | | | | | | | | | | |
| 18 | | | | | | | | | | | | | | | | | | | | | | | | | | | | |
| 19 | | | | | | | | | | | | | | | | | | | | | | | | | | | | |

| 300 | 302 | 304 | 306 | 308 | 310 | 312 | 314 | 316 |
|---|---|---|---|---|---|---|---|---|
| | Host File ID | Subfile ID | Subfile Size (KB) | MBW ID | MBW Offset | MBW Address | MBW Cell Type | MBW Logical Die ID |
| | 0 | 0 | 768 | 0 | 0 | 0Ah | TLC | 0,1,2,3 |
| | 0 | 1 | 768 | 1 | 0 | 01h | TLC | 4,5,6,7 |
| | 0 | 2 | 400 | 2 | 0 | 100h | SLC | 8,9,10,11 |
| | 1 | 0 | 368 | 0 | 100 | 100h | SLC | 8,9,10,11 |
| | 1 | 1 | 768 | 1 | 0 | 200h | TLC | 12,13,14,15 |
| | ... | ... | ... | ... | ... | ... | ... | ... |

FIG. 3

| Meta Block | Channel 0 Die 0 Logical Die 0 | | | | Channel 1 Die 0 Logical Die 1 | | | | Channel 2 Die 0 Logical Die 2 | | | | Channel 3 Die 0 Logical Die 3 | |
|---|---|---|---|---|---|---|---|---|---|---|---|---|---|---|
| Wordline | Plane 0 | Plane 1 | Plane 2 | Plane 3 | Plane 0 | Plane 1 | Plane 2 | Plane 3 | Plane 0 | Plane 1 | Plane 2 | Plane 3 | Plane 0 | Plane 1 | Plane 2 |
| 0 | JPC0-0 | JPC0-1 | JPC0-2 | JPC0-3 | JPC0-4 | JPC0-5 | JPC0-6 | JPC0-7 | JPC0-8 | JPC0-9 | JPC0-10 | JPC0-11 | JPC0-12 | JPC0-13 | JPC0-14 |
| 1 | JPC1-0 | JPC1-1 | JPC1-2 | JPC1-3 | JPC1-4 | JPC1-5 | JPC1-6 | JPC1-7 | JPC1-8 | JPC1-9 | JPC1-10 | JPC1-11 | JPC1-12 | JPC1-13 | JPC1-14 |
| 2 | JPC2-0 | JPC2-1 | JPC2-2 | JPC2-3 | JPC2-4 | JPC2-5 | JPC2-6 | JPC2-7 | JPC2-8 | JPC2-9 | JPC2-10 | JPC2-11 | JPC2-12 | JPC2-13 | JPC2-14 |
| 3 | Normal | Normal | Normal | Normal | Normal | Normal | Normal | Normal | Normal | Normal | Normal | Normal | Normal | Normal | Normal |
| 4 | Normal | Normal | Normal | Normal | Normal | Normal | Normal | Normal | Normal | Normal | Normal | Normal | Normal | Normal | Normal |
| 5 | Normal | Normal | Normal | Normal | Normal | Normal | Normal | Normal | Normal | Normal | Normal | Normal | Normal | Normal | Normal |
| 6 | | | | | | | | | | | | | | | |
| 7 | | | | | | | | | | | | | | | |
| 8 | | | | | | | | | | | | | | | |
| 9 | | | | | | | | | | | | | | | |
| 10 | | | | | | | | | | | | | | | |
| 11 | | | | | | | | | | | | | | | |
| 12 | | | | | | | | | | | | | | | |
| 13 | | | | | | | | | | | | | | | |
| 14 | | | | | | | | | | | | | | | |
| 15 | | | | | | | | | | | | | | | |
| 16 | | | | | | | | | | | | | | | |
| 17 | | | | | | | | | | | | | | | |
| 18 | | | | | | | | | | | | | | | |
| 19 | | | | | | | | | | | | | | | |

FIG. 6

| | Channel 0 | | | | Channel 1 | | | | Channel 2 | | | | Channel 3 | | | |
|---|---|---|---|---|---|---|---|---|---|---|---|---|---|---|---|---|
| | Die 1 | | | | Die 1 | | | | Die 1 | | | | Die 1 | | | |
| | Logical Die 4 | | | | Logical Die 5 | | | | Logical Die 6 | | | | Logical Die 7 | | | |
| Plane 3 | Plane 0 | Plane 1 | Plane 2 | Plane 3 | Plane 0 | Plane 1 | Plane 2 | Plane 3 | Plane 0 | Plane 1 | Plane 2 | Plane 3 | Plane 0 | Plane 1 | Plane 2 | Plane 3 |
| JPC0-15 | JPC0-16 | JPC0-17 | JPC0-18 | JPC0-19 | JPC0-20 | JPC0-21 | JPC0-22 | JPC0-23 | JPC0-24 | JPC0-25 | JPC0-26 | JPC0-27 | JPC0-28 | JPC0-29 | JPC0-30 | JPC0-31 |
| JPC1-15 | JPC1-16 | JPC1-17 | JPC1-18 | JPC1-19 | JPC1-20 | JPC1-21 | JPC1-22 | JPC1-23 | JPC1-24 | JPC1-25 | JPC1-26 | JPC1-27 | JPC1-28 | JPC1-29 | JPC1-30 | JPC1-31 |
| JPC2-15 | JPC2-16 | JPC2-17 | JPC2-18 | JPC2-19 | JPC2-20 | JPC2-21 | JPC2-22 | JPC2-23 | JPC2-24 | JPC2-25 | JPC2-26 | JPC2-27 | JPC2-28 | JPC2-29 | JPC2-30 | JPC2-31 |
| Normal | Normal | Normal | Normal | Normal | Normal | Normal | Normal | Normal | Normal | Normal | Normal | Normal | Normal | Normal | Normal | Normal |
| Normal | Normal | Normal | Normal | Normal | Normal | Normal | Normal | Normal | Normal | Normal | Normal | Normal | Normal | Normal | Normal | Normal |
| Normal | Normal | Normal | Normal | Normal | Normal | Normal | Normal | Normal | Normal | Normal | Normal | Normal | Normal | Normal | Normal | Normal |
| Normal | Normal | Normal | Normal | Normal | Normal | Normal | Normal | Normal | Normal | Normal | Normal | Normal | Normal | Normal | Normal | Normal |
| Normal | Normal | Normal | Normal | Normal | Normal | Normal | Normal | Normal | Normal | Normal | Normal | Normal | Normal | Normal | Normal | Normal |
| Normal | Normal | Normal | Normal | Normal | Normal | Normal | Normal | Normal | Normal | Normal | Normal | Normal | Normal | Normal | Normal | Normal |
| Normal | Normal | Normal | Normal | Normal | Normal | Normal | Normal | Normal | Normal | Normal | Normal | Normal | Normal | Normal | Normal | Normal |

| Meta Block | Channel 0 Die 0 Logical Die 0 | | | | Channel 1 Die 0 Logical Die 1 | | | | Channel 2 Die 0 Logical Die 2 | | | | Channel 3 Die 0 Logical Die 3 | | | |
|---|---|---|---|---|---|---|---|---|---|---|---|---|---|---|---|---|
| Wordline | Plane 0 | Plane 1 | Plane 2 | Plane 3 | Plane 0 | Plane 1 | Plane 2 | Plane 3 | Plane 0 | Plane 1 | Plane 2 | Plane 3 | Plane 0 | Plane 1 | Plane 2 | |
| 0 | JPC0-0 | JPC0-1 | JPC0-2 | JPC0-3 | JPC0-4 | JPC0-5 | JPC0-6 | JPC0-7 | JPC0-8 | JPC0-9 | JPC0-10 | JPC0-11 | JPC0-12 | JPC0-13 | JPC0-14 | |
| 1 | Normal | Normal | Normal | Normal | Normal | Normal | Normal | Normal | Normal | Normal | Normal | Normal | Normal | Normal | Normal | |
| 2 | JPC1-0 | JPC1-1 | JPC1-2 | JPC1-3 | JPC1-4 | JPC1-5 | JPC1-6 | JPC1-7 | JPC1-8 | JPC1-9 | JPC1-10 | JPC1-11 | JPC1-12 | JPC1-13 | JPC1-14 | |
| 3 | Normal | Normal | Normal | Normal | Normal | Normal | Normal | Normal | Normal | Normal | Normal | Normal | Normal | Normal | Normal | |
| 4 | Normal | Normal | Normal | Normal | Normal | Normal | Normal | Normal | Normal | Normal | Normal | Normal | Normal | Normal | Normal | |
| 5 | JPC2-0 | JPC2-1 | JPC2-2 | JPC2-3 | JPC2-4 | JPC2-5 | JPC2-6 | JPC2-7 | JPC2-8 | JPC2-9 | JPC2-10 | JPC2-11 | JPC2-12 | JPC2-13 | JPC2-14 | |
| 6 | Normal | Normal | Normal | Normal | Normal | Normal | Normal | Normal | Normal | Normal | Normal | Normal | Normal | Normal | Normal | |
| 7 | | | | | | | | | | | | | | | | |
| 8 | | | | | | | | | | | | | | | | |
| 9 | | | | | | | | | | | | | | | | |
| 10 | | | | | | | | | | | | | | | | |
| 11 | | | | | | | | | | | | | | | | |
| 12 | | | | | | | | | | | | | | | | |
| 13 | | | | | | | | | | | | | | | | |
| 14 | | | | | | | | | | | | | | | | |
| 15 | | | | | | | | | | | | | | | | |
| 16 | | | | | | | | | | | | | | | | |
| 17 | | | | | | | | | | | | | | | | |
| 18 | | | | | | | | | | | | | | | | |
| 19 | | | | | | | | | | | | | | | | |

| Channel 0 | | | | Channel 1 | | | | Channel 2 | | | | Channel 3 | | | |
|---|---|---|---|---|---|---|---|---|---|---|---|---|---|---|---|
| Die 1 | | | | Die 1 | | | | Die 1 | | | | Die 1 | | | |
| Logical Die 4 | | | | Logical Die 5 | | | | Logical Die 6 | | | | Logical Die 7 | | | |
| Plane 0 | Plane 1 | Plane 2 | Plane 3 | Plane 0 | Plane 1 | Plane 2 | Plane 3 | Plane 0 | Plane 1 | Plane 2 | Plane 3 | Plane 0 | Plane 1 | Plane 2 | Plane 3 |
| JPC0-15 | JPC0-16 | JPC0-17 | JPC0-18 | JPC0-19 | JPC0-20 | JPC0-21 | JPC0-22 | JPC0-23 | JPC0-24 | JPC0-25 | JPC0-26 | JPC0-27 | JPC0-28 | JPC0-29 | JPC0-30 | JPC0-31
| Normal | Normal | Normal | Normal | Normal | Normal | Normal | Normal | Normal | Normal | Normal | Normal | Normal | Normal | Normal | Normal |
| JPC1-15 | JPC1-16 | JPC1-17 | JPC1-18 | JPC1-19 | JPC1-20 | JPC1-21 | JPC1-22 | JPC1-23 | JPC1-24 | JPC1-25 | JPC1-26 | JPC1-27 | JPC1-28 | JPC1-29 | JPC1-30 | JPC1-31 |
| Normal | Normal | Normal | Normal | Normal | Normal | Normal | Normal | Normal | Normal | Normal | Normal | Normal | Normal | Normal | Normal |
| JPC2-15 | JPC2-16 | JPC2-17 | JPC2-18 | JPC2-19 | JPC2-20 | JPC2-21 | JPC2-22 | JPC2-23 | JPC2-24 | JPC2-25 | JPC2-26 | JPC2-27 | JPC2-28 | JPC2-29 | JPC2-30 | JPC2-31 |
| Normal | Normal | Normal | Normal | Normal | Normal | Normal | Normal | Normal | Normal | Normal | Normal | Normal | Normal | Normal | Normal |

FIG. 7 (Continued)

| Meta Block | Channel 0 Die 0 Logical Die 0 | | | | Channel 1 Die 0 Logical Die 1 | | | | Channel 2 Die 0 Logical Die 2 | | | | Channel 3 Die 0 Logical Die 3 | | | |
|---|---|---|---|---|---|---|---|---|---|---|---|---|---|---|---|---|
| Wordline | Plane 0 | Plane 1 | Plane 2 | Plane 3 | Plane 0 | Plane 1 | Plane 2 | Plane 3 | Plane 0 | Plane 1 | Plane 2 | Plane 3 | Plane 0 | Plane 1 | Plane 2 | Plane 3 |
| 0 | Normal | JPC0-0 | JPC0-1 | JPC0-2 | JPC0-3 | JPC0-4 | JPC0-5 | JPC0-6 | JPC0-7 | JPC0-8 | JPC0-9 | JPC0-10 | JPC0-11 | JPC0-12 | JPC0-13 | |
| 1 | JPC0-31 | Normal | Normal | JPC1-0 | JPC1-1 | JPC1-2 | JPC1-3 | JPC1-4 | JPC1-5 | JPC1-6 | JPC1-7 | JPC1-8 | JPC1-9 | JPC1-10 | | |
| 2 | JPC1-28 | JPC1-29 | JPC1-30 | JPC1-31 | Normal | Normal | Normal | Normal | JPC2-0 | JPC2-1 | JPC2-2 | JPC2-3 | JPC2-4 | JPC2-5 | | |
| 3 | JPC2-23 | JPC2-24 | JPC2-25 | JPC2-26 | JPC2-27 | JPC2-28 | JPC2-29 | JPC2-30 | JPC2-31 | Normal | Normal | Normal | Normal | Normal | | |
| 4 | Normal | Normal | Normal | Normal | Normal | Normal | Normal | Normal | Normal | Normal | Normal | Normal | Normal | Normal | | |
| 5 | | | | | | | | | | | | | | | | |
| 6 | | | | | | | | | | | | | | | | |
| 7 | | | | | | | | | | | | | | | | |
| 8 | | | | | | | | | | | | | | | | |
| 9 | | | | | | | | | | | | | | | | |
| 10 | | | | | | | | | | | | | | | | |
| 11 | | | | | | | | | | | | | | | | |
| 12 | | | | | | | | | | | | | | | | |
| 13 | | | | | | | | | | | | | | | | |
| 14 | | | | | | | | | | | | | | | | |
| 15 | | | | | | | | | | | | | | | | |
| 16 | | | | | | | | | | | | | | | | |
| 17 | | | | | | | | | | | | | | | | |
| 18 | | | | | | | | | | | | | | | | |
| 19 | | | | | | | | | | | | | | | | |

| | Channel 0<br>Die 1<br>Logical Die 4 | | | | Channel 1<br>Die 1<br>Logical Die 5 | | | | Channel 2<br>Die 1<br>Logical Die 6 | | | | Channel 3<br>Die 1<br>Logical Die 7 | | | |
|---|---|---|---|---|---|---|---|---|---|---|---|---|---|---|---|---|
| Plane 3 | Plane 0 | Plane 1 | Plane 2 | Plane 3 | Plane 0 | Plane 1 | Plane 2 | Plane 3 | Plane 0 | Plane 1 | Plane 2 | Plane 3 | Plane 0 | Plane 1 | Plane 2 | Plane 3 |
| JPC0-14 | JPC0-15 | JPC0-16 | JPC0-17 | JPC0-18 | JPC0-19 | JPC0-20 | JPC0-21 | JPC0-22 | JPC0-23 | JPC0-24 | JPC0-25 | JPC0-26 | JPC0-27 | JPC0-28 | JPC0-29 | JPC0-30 |
| JPC1-11 | JPC1-12 | JPC1-13 | JPC1-14 | JPC1-15 | JPC1-16 | JPC1-17 | JPC1-18 | JPC1-19 | JPC1-20 | JPC1-21 | JPC1-22 | JPC1-23 | JPC1-24 | JPC1-25 | JPC1-26 | JPC1-27 |
| JPC2-6 | JPC2-7 | JPC2-8 | JPC2-9 | JPC2-10 | JPC2-11 | JPC2-12 | JPC2-13 | JPC2-14 | JPC2-15 | JPC2-16 | JPC2-17 | JPC2-18 | JPC2-19 | JPC2-20 | JPC2-21 | JPC2-22 |
| Normal | Normal | Normal | Normal | Normal | Normal | Normal | Normal | Normal | Normal | Normal | Normal | Normal | Normal | Normal | Normal | Normal |
| Normal | Normal | Normal | Normal | Normal | Normal | Normal | Normal | Normal | Normal | Normal | Normal | Normal | Normal | Normal | Normal | Normal |

| Meta Block | Channel 0 Die 0 Logical Die 0 | | | | Channel 1 Die 0 Logical Die 1 | | | | Channel 2 Die 0 Logical Die 2 | | | | Channel 3 Die 0 Logical Die 3 | | | |
|---|---|---|---|---|---|---|---|---|---|---|---|---|---|---|---|---|
| Wordline | Plane 0 | Plane 1 | Plane 2 | Plane 3 | Plane 0 | Plane 1 | Plane 2 | Plane 3 | Plane 0 | Plane 1 | Plane 2 | Plane 3 | Plane 0 | Plane 1 | Plane 2 | Plane 3 |
| 0 | Normal | JPC0-0 | JPC0-1 | JPC0-2 | JPC0-3 | JPC0-4 | JPC0-5 | JPC0-6 | JPC0-7 | JPC0-8 | JPC0-9 | JPC0-10 | JPC0-11 | JPC0-12 | JPC0-13 |
| 1 | JPC1-31 | Normal | Normal | Normal | JPC1-0 | JPC1-1 | JPC1-2 | JPC1-3 | JPC1-4 | JPC1-5 | JPC1-6 | JPC1-7 | JPC1-8 | JPC1-9 | JPC1-10 |
| 2 | JPC1-28 | JPC1-29 | JPC1-30 | JPC1-31 | Normal | Normal | Normal | Normal | Normal | JPC2-0 | JPC2-1 | JPC2-2 | JPC2-3 | JPC2-4 | JPC2-5 |
| 3 | JPC2-23 | JPC2-24 | JPC2-25 | JPC2-26 | Normal | Normal | Normal | Normal | JPC2-31 | Normal | Normal | Normal | Normal | Normal | Normal |
| 4 | JPC2-27 | JPC2-28 | JPC2-29 | JPC2-30 | | | | | | Normal | Normal | Normal | | | |
| 5 | | | | | | | | | | Normal | Normal | Normal | | | |
| 6 | | | | | | | | | | | | | | | |
| 7 | | | | | | | | | | | | | | | |
| 8 | | | | | | | | | | | | | | | |
| 9 | | | | | | | | | | | | | | | |
| 10 | | | | | | | | | | | | | | | |
| 11 | | | | | | | | | | | | | | | |
| 12 | | | | | | | | | | | | | | | |
| 13 | | | | | | | | | | | | | | | |
| 14 | | | | | | | | | | | | | | | |
| 15 | | | | | | | | | | | | | | | |
| 16 | | | | | | | | | | | | | | | |
| 17 | | | | | | | | | | | | | | | |
| 18 | | | | | | | | | | | | | | | |
| 19 | | | | | | | | | | | | | | | |

| Channel 0 | | | | Channel 1 | | | | Channel 2 | | | | Channel 3 | | | |
|---|---|---|---|---|---|---|---|---|---|---|---|---|---|---|---|
| Die 1 | | | | Die 1 | | | | Die 1 | | | | Die 1 | | | |
| Logical Die 4 | | | | Logical Die 5 | | | | Logical Die 6 | | | | Logical Die 7 | | | |
| Plane 0 | Plane 1 | Plane 2 | Plane 3 | Plane 0 | Plane 1 | Plane 2 | Plane 3 | Plane 0 | Plane 1 | Plane 2 | Plane 3 | Plane 0 | Plane 1 | Plane 2 | Plane 3 |
| JPC0-14 | JPC0-15 | JPC0-16 | JPC0-17 | JPC0-18 | JPC0-19 | JPC0-20 | JPC0-21 | JPC0-22 | JPC0-23 | JPC0-24 | JPC0-25 | JPC0-26 | JPC0-27 | JPC0-28 | JPC0-29 | JPC0-30 |
| JPC1-11 | JPC1-12 | JPC1-13 | JPC1-14 | JPC1-15 | JPC1-16 | JPC1-17 | JPC1-18 | JPC1-19 | JPC1-20 | JPC1-21 | JPC1-22 | JPC1-23 | JPC1-24 | JPC1-25 | JPC1-26 | JPC1-27 |
| JPC2-6 | JPC2-7 | JPC2-8 | JPC2-9 | JPC2-10 | JPC2-11 | JPC2-12 | JPC2-13 | JPC2-14 | JPC2-15 | JPC2-16 | JPC2-17 | JPC2-18 | Normal | Normal | Normal | Normal |
| Normal | Normal | Normal | Normal | Normal | Normal | Normal | Normal | JPC2-19 | JPC2-20 | JPC2-21 | JPC2-22 | Normal | Normal | Normal | Normal |
| Normal | Normal | Normal | Normal | Normal | | | | Normal | Normal | Normal | | | | | |
| Normal | Normal | Normal | | | | | | | | | | | | | |

SEGREGATING LARGE DATA BLOCKS FOR DATA STORAGE SYSTEM

CROSS-REFERENCE TO RELATED APPLICATION

This application claims priority to and the benefit of U.S. Provisional Patent Application No. 63/386,938, filed on Dec. 12, 2022, the entire contents of which is incorporated herein by reference.

FIELD

This application relates generally to data storage devices, and more particularly but not exclusively, to handling updates of blocks of data having relatively large sizes.

BACKGROUND

This section introduces aspects that may help facilitate a better understanding of the disclosure. Accordingly, the statements of this section are to be read in this light and are not to be understood as admissions about what is in the prior art or what is not in the prior art.

Write amplification (WA) is an undesirable phenomenon associated with flash memory and solid-state drives (SSDs) due to which the actual amount of information physically written to the storage media can be significantly larger than the logical amount of data intended to be written. For example, because the erase operation has a coarser granularity than the write operation, a process of performing erase and write operations on user data typically results in moving (or rewriting) user data and metadata more than once. As a result, in some examples, rewriting a block of data causes an already-used-portion of flash memory to be read, updated, and written to a new location, which is preceded by erasing the new location if that location was previously used at some point in time. Due to different respective granularities of the erase and write operations, larger portions of flash are typically erased and rewritten compared to the amount of new data. This granularity mismatch effectively increases the number of writes, which can shorten the lifespan of the corresponding data storage device. In addition, the increased volume of writes can consume bandwidth, thereby detrimentally affecting the throughput performance of the data storage device.

SUMMARY

Disclosed herein are various embodiments of methods and apparatus for efficiently handling large data files and their updates in NAND memory. In one example, provided is a data-storage system configured to reduce the frequency of data relocations by segregating a large data file into a plurality of subfiles. The size of such subfiles is appropriately selected to reduce the probability of occurrence for host-relocation conflicts and the magnitude of write amplification, thereby enabling the data-storage system to provide better quality of service (QoS) while substantially maintaining acceptable levels of other pertinent performance characteristics. In some examples, a sequence of host read-modify-write commands is handled by generating a copy of implicated subfiles in a data buffer, applying subfile updates to the copy in the data buffer in accordance with the sequence, and relocating the implicated subfiles in the NAND memory using the updated versions thereof from the data buffer.

According to an example embodiment, provided is a data storage device, comprising: a nonvolatile memory to store data; a second memory to store a logical-to-physical (L2P) table and a subfile mapping table; and a controller coupled to the nonvolatile memory and the second memory and configured to: in response to a host command to write a large data file to the nonvolatile memory, segregate the large data file into a plurality of subfiles, the large data file having a file size larger than a first fixed size, each subfile of the plurality of subfiles having a respective size smaller than or equal to the first fixed size; store a first mapping of the plurality of subfiles in the subfile mapping table, the first mapping including, for each subfile of the plurality of subfiles, a respective word-line physical address; cause the plurality of subfiles to be written to the nonvolatile memory based on the first mapping; and access the L2P table and the subfile mapping table to control a memory operation on the large data file in the nonvolatile memory.

According to another example embodiment, provided is a method performed by a data storage device, the method comprising: in response to a host command to write a large data file to a nonvolatile memory, segregating, via a controller, the large data file into a plurality of subfiles, the large data file having a file size larger than a first fixed size, each subfile of the plurality of subfiles having a respective size smaller than or equal to the first fixed size; storing, via the controller, a first mapping of the plurality of subfiles in a subfile mapping table, the first mapping including, for each subfile of the plurality of subfiles, a respective word-line physical address; causing, via the controller, the plurality of subfiles to be written to the nonvolatile memory based on the first mapping; and accessing, via the controller, an L2P table and the subfile mapping table to control a memory operation on the large data file in the nonvolatile memory.

According to yet another example embodiment, provided is a data storage device, comprising: means for segregating a large data file into a plurality of subfiles in response to a host command to write the large data file to a nonvolatile memory, the large data file having a file size larger than a first fixed size, each subfile of the plurality of subfiles having a respective size smaller than or equal to the first fixed size; means for storing a first mapping of the plurality of subfiles in a subfile mapping table, the first mapping including, for each subfile of the plurality of subfiles, a respective word-line physical address; means for causing the plurality of subfiles to be written to the nonvolatile memory based on the first mapping; and means for accessing an L2P table and the subfile mapping table to control a memory operation on the large data file in the nonvolatile memory.

Various aspects of the present disclosure provide for improvements in data storage devices, for example, optimizing the processes in which host device inputs/outputs are handled by data storage devices. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

BRIEF DESCRIPTION OF THE DRAWINGS

FIG. 2 is a block diagram illustrating a memory layout that can be used in the data-storage system of FIG. 1 according to an embodiment.

FIG. 3 is a block diagram illustrating an example subfile mapping table that can be used in the data-storage system of FIG. 1 according to an embodiment.

FIGS. 6-9 are block diagrams illustrating data layouts in the memory layout of FIG. 2 according to various examples.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein may be applicable to other types of solid-state memory, such as NOR, PCM ("Phase Change Memory"), ReRAM, etc.

Figure 1:
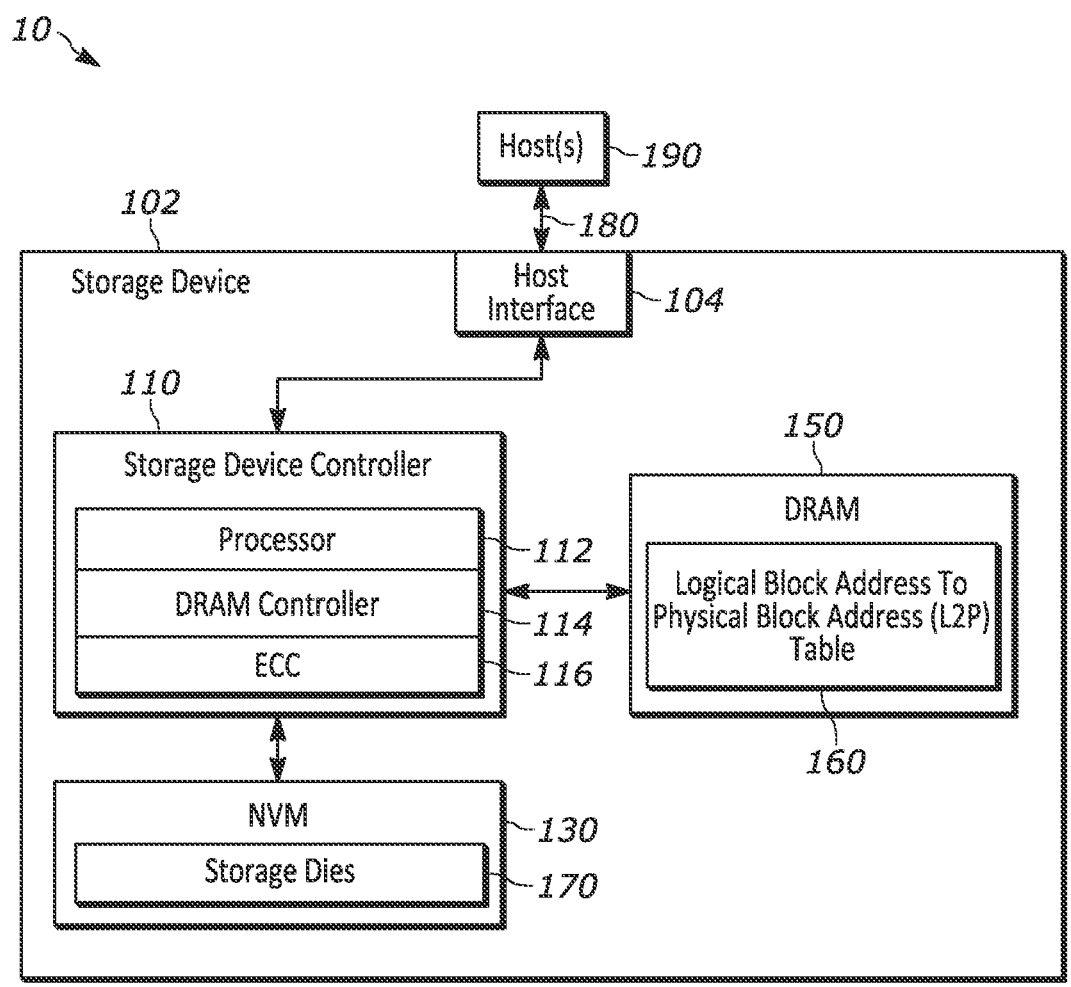
FIG. 1 is a block diagram illustrating a data-storage system in which various embodiments may be practiced.

FIG. 1 is a block diagram illustrating a data-storage system 10 in which example embodiments can be practiced. System 10 comprises a data storage device 102 connected to a host device 190 by way of a communication path 180. In an example embodiment, communication path 180 can be implemented using an electrical bus, a wireless connection, or any other suitable data link. Data storage device 102 can be a flash memory device, e.g., an SSD, a flash memory, or other suitable nonvolatile memory (NVM).

In some embodiments, data storage device 102 may be embedded within host device 190. In some other embodiments, data storage device 102 may be removable from host device 190, e.g., may be removably coupled to host device 190 in accordance with a removable universal serial bus (USB) configuration. In some embodiments, data storage device 102 may be used as an embedded storage drive, e.g., a mobile embedded storage drive, an enterprise storage drive (ESD), a client storage device, a cloud storage drive, or other suitable data storage device.

As shown in FIG. 1, data storage device 102 comprises a host-device interface 104, an electronic controller 110, an NVM 130, and a volatile memory (e.g., a DRAM) 150. In operation, host-device interface 104 enables communications between data storage device 102 and host device(s) 190. Such communications may include, inter alia, transmission of data between NVM 130 and host device(s) 190. NVM 130 comprises storage dies 170, which may include any one type or any suitable combination of NAND flash devices, NOR flash devices, and other suitable nonvolatile memory devices. Storage dies 170 may be organized into channels, each of the channels being based on a corresponding bus, e.g., an 8-bit bus, connecting the corresponding subset of storage dies 170 to controller 110. Individual ones of storage dies 170 may further be organized into a hierarchy of planes, blocks, and pages. NVM 130 and/or individual ones of the storage dies 170 thereof may also include support circuitry (not explicitly shown in FIG. 1), such as read and write circuitry. Such read/write circuitry may be implemented in a single component or may be divided into separate components, such as a read-circuitry component and a separate write-circuitry component. In an example embodiment, DRAM 150 is used, inter alia, to store an L2P table 160. In operation, data storage device 102 uses L2P table 160 to translate logical addresses of input/output (I/O) requests to corresponding flash-memory addresses. The layer that performs the translation is referred to as the flash translation layer (FTL).

Controller 110 includes components, such as circuits, firmware, and software, that bridge NVM 130 to host-device interface 104, with only some of such components being explicitly shown in FIG. 1 for better clarity. For example, controller 110 may include: (i) an embedded processor 112; (ii) an electrically erasable firmware read-only memory (ROM, not explicitly shown in FIG. 1); (iii) a DRAM controller 114; (iv) an error-correction code (ECC) circuit or module 116; and (v) a flash component interface (not explicitly shown in FIG. 1). In some embodiments, controller 110 may also incorporate DRAM 150 or other functionally similar volatile-memory having stored therein the L2P table 160.

Processor 112 is configured to support, e.g., some or all of the following operations: wear leveling, bad-block management, data scrambling, error-correction coding, garbage collection, trim, address mapping, and other pertinent operations. DRAM controller 114 operates as an electronic controller of DRAM 150. ECC entity 116 may typically include two submodules, with a first of the submodules running a first ECC applied to data stored in NVM 130, and with a second of the submodules running a different second ECC applied to data stored in DRAM 150, including the data of L2P table 160 and other tables and/or control-data structures that may be stored therein.

Host device 190 may address data stored in NVM 130 using a logical address. However, the data are stored in NVM 130 at physical addresses. The L2P table 160 is used to map from the logical address used by host device 190 to the physical address where the data are actually stored in NVM 130. When host device 190 requests to read data, controller 110 may obtain the physical address from L2P table 160 to access the requested data. When host device 190 requests to write or update data in NVM 130, controller 110 may update L2P table 160 accordingly.

A master L2P table may be stored in NVM 130 but, to be efficiently used or updated by controller 110, at least a pertinent portion of the master L2P table is stored in DRAM 150, e.g., in L2P table 160. When L2P table 160 is updated, the updates need to be written back into the master L2P table stored in NVM 130. During the design process of data storage device 102, it may be stipulated whether DRAM 150 will be specified to hold a copy of the whole master L2P table for the entire logical address space. A decision to not hold the whole master L2P table in DRAM 150 may be due to, e.g., a size constraint of DRAM 150. Similar design decisions may also be made with respect to other tables that may be used instead of, in addition to, or in conjunction with L2P table 160 according to various embodiments.

In some examples of page-level L2P mapping, a physical address may include a channel number, a die number, a block number, and a page number. For a 4-KB page size, a 32-TB NVM 130 may require approximately 32 GB of such L2P entries. With the added ECC overhead, this volume of L2P entries can be accommodated, e.g., by a 40-GB DRAM 150. This estimate of the DRAM capacity scales approximately linearly with the data capacity of NVM 130.

Although FIG. 1 shows controller 110 as being connected to and employing DRAM 150, alternative embodiments are also possible. For example, in one such embodiment, controller 110 may employ, for similar functions, a built-in cache memory, e.g., a static random-access memory (static RAM or SRAM), which is a part of the controller circuitry. In another embodiment, instead of DRAM 150, controller 110 may use a dedicated portion of NVM 130 as storage for L2P table 160 and any associated mapping tables.

In a data center employing data-storage system 10, data files with the size in the range between 1 GB and 10 TB are often encountered. In operation, multiple terabytes of data can typically be accessed and rewritten by multiple users at a given pace. With the 4 KB read/write granularity, frequent changes from various users on the same large files may lead to frequent read-modify-write (RMW) operations, which are sometimes characterized by significant and undesirable effects of WA and the corresponding deterioration of the QoS metrics. In some examples, such frequent changes on the same files are due to the host data model training and/or data iteration at the same memory address. Another undesirable impact of WA is on the operation of the Data Processing Unit (DPU) wherein data access slowdowns may result in further performance and/or QoS constraints on the corresponding data-storage system 10.

At least some of the above-indicated and possibly some other related problems in the state of the art can beneficially be addressed using various examples, aspects, features, and/or embodiments disclosed herein. In some examples, data-storage system 10 is configured to reduce the frequency of data relocations by segregating large data files into respective pluralities of subfiles and then using the subfiles for updates associated with the host RMW operations. The size of subfiles is appropriately selected to beneficially reduce the probability of occurrence for host-relocation conflicts and the magnitude of WA, and thereby, data-storage system 10 provides better QoS while substantially maintaining acceptable levels of other pertinent performance characteristics.

Herein, RMW is a class of atomic operations that both read a memory location and write a new value into the memory location, either with a completely new value or some function of the previous value. RMW operations can be used to, e.g., read a specific page or modify a few words, bytes, or bits in a page. A read command of an RMW operation causes the desired data to be copied from the flash memory to a data buffer. The modify command of the RMW operation then causes the data in the data buffer to be modified as needed. A write command of the RMW operation causes the modified data to be written back to the flash memory. In some examples, the RMW operates on a minimum write unit, which can be smaller than a page. In some additional examples, multiple pages are programmed at once.

Some embodiments disclosed herein implement a tradeoff between write amplification and performance. For example, smaller map unit sizes may result in reduced write amplification, as less data is being read, modified, and then rewritten on the NAND. In contrast, increasing the size of the map unit in some embodiments may increase write amplification somewhat, e.g., by rewriting more information on every modification/write by the host to a special purpose data area, at the cost of endurance, but with the benefit of better performance at some specific times. It should also be noted that write amplification is the quotient resulting from the total writes to the NAND divided by the host writes to the device. As such, write amplification may be affected by additional factors beyond the above-mentioned granularity mismatches, with the example additional factors including media management policies related to read disturb, data retention, error mitigation, redundancy, metadata, etc.

At least some approaches disclosed herein are transferrable to hard disk drives (HDDs).

Figure 2:
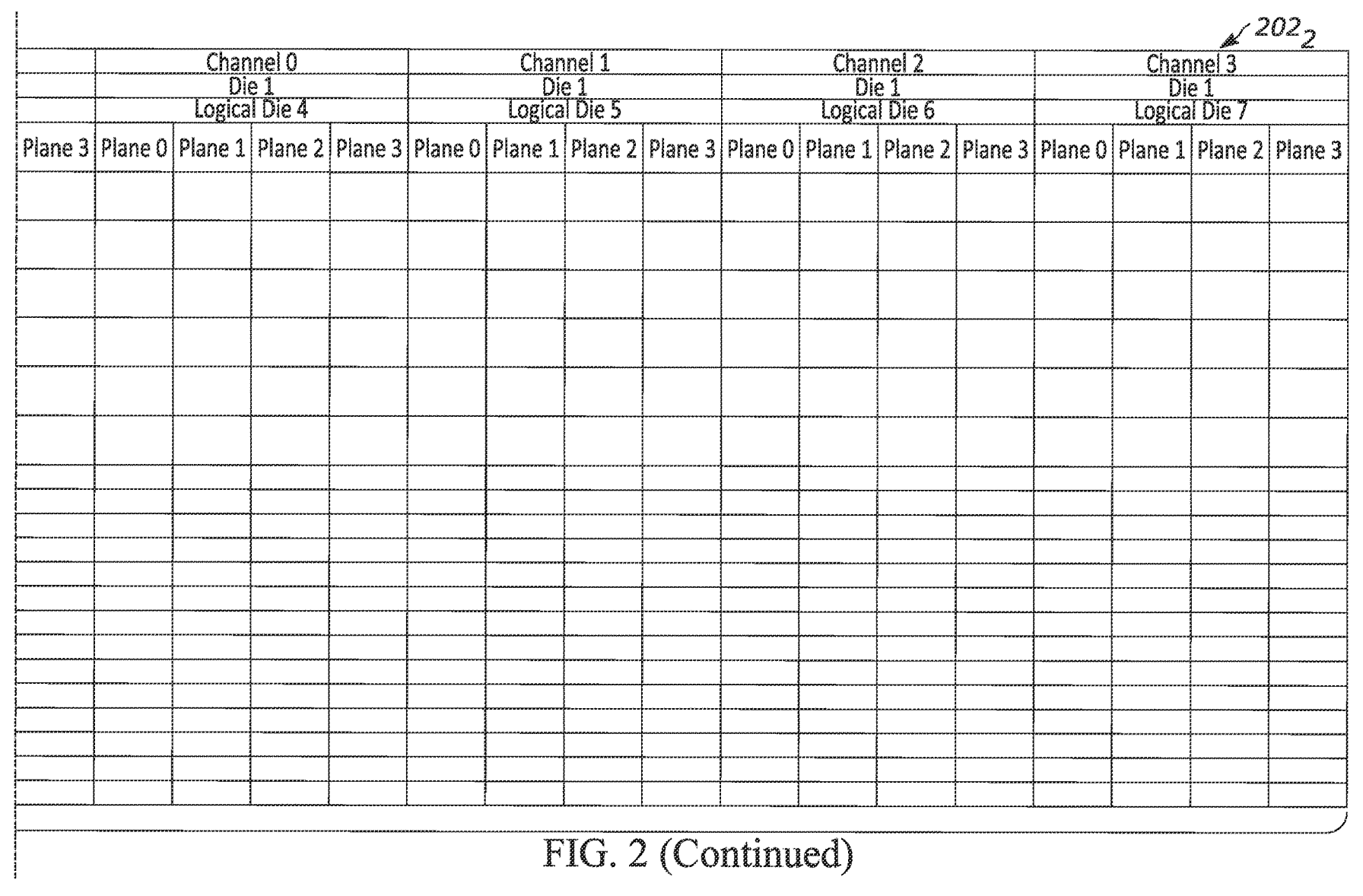

FIG. 2 is a block diagram illustrating an example memory layout 200 that can be used in data storage device 102 according to an embodiment. In other embodiments, other layouts can also be used. At least some example values mentioned herein below in reference to FIG. 2 may be different in other examples or embodiments of memory layout 200.

According to memory layout 200, a first meta block, labeled 202$_1$, has memory blocks in a first physical die, labeled Die 0. A second meta block, labeled 202$_2$, has memory blocks in a second physical die, labeled Die 1. Taken together, meta blocks 202$_1$ and 202$_2$ form a jumbo block 204. Each of the physical dies Die 0 and Die 1 is partitioned into four respective logical dies, labeled Logical Die 0 through Logical Die 3, respectively. Logical Dies 0, 1, 2, 3 can be accessed using channels 0, 1, 2, 3, respectively. Each of the logical dies has four respective planes, labeled Plane 0 through Plane 3, respectively. Each of the planes is connected to word lines WL0, WL1, . . . , WL19. Each word line (WL) typically includes a plurality of (for example, four) respective string lines (not explicitly shown in FIG. 2). Each of the planes includes twenty respective WL blocks, one of which is labeled 210 in FIG. 2. Memory layout 200 has a total of 640 WL blocks 210. Each of meta blocks 202$_1$ and 202$_2$ has 320 respective WL blocks 210.

In one illustrative example, WL block 210 comprises triple-level cells (TLCs), each capable of storing three bits. In this example, WL block 210 has a size of 48 KB and can store twelve 4-KB pages. Each row of WL blocks connected to the same word line WLn (n=0, 1, . . . , 19) in the meta block 202$_i$ (i=1, 2) has a size of 768 KB. Each row of WL blocks connected to the same word line WLn in the jumbo block 204 has a size of 1536 KB. The read/write granularity in memory layout 200 is one page. The erase granularity in memory layout 200 is one plane. In some other examples, more than two meta blocks 202 can be logically combined to form a corresponding jumbo block. In various examples, a WL block may comprise various types of NAND memory cells, such as single-level cells (SLCs), multi-level cells (MLC), TLCs, or quad-level cells (QLCs). In such various examples, a corresponding WL block has a corresponding size that may be different from 48 KB.

In an example embodiment, data storage device 102 operates to segregate a large data file into a plurality of WL-level subfiles. The host may indicate the size of the input file to be written to NVM 130 using the Non-Volatile Memory Express (NVMe) protocol or an equivalent logical storage interface protocol. The data storage device may indicate a "large" file using Optimal Read/Write/Deallocate Size parameters as described in storage interface protocols. It should be noted that the host may use multiple write commands or operations to transfer a "large" file, each of which is individually smaller than the "large" file size. Herein, a "large" file is a file having a size that is larger than the combined size of the WL blocks (such as 210, FIG. 2) connected to the same word line WLn in meta block 202$_i$ or in jumbo block 204. In the above illustrative example, a file that is "large" in this sense has a size larger than the meta-block word-line (MBW) capacity of 768 KB or the jumbo-block word-line (JBW) capacity of 1536 KB.

In some examples, the MBW capacity is not limited to a single physical die and can similarly be distributed over multiple physical dies, such as two physical dies or four physical dies. A corresponding JBW capacity may thus comprise, e.g., four MBW capacities in four times more physical dies. In some examples, a single physical die may have multiple planes, such as two, four, or more planes, e.g., as indicated in FIG. 2. When a physical die has only one plane or two planes, the MBW capacity may span more physical dies. In contrast, when a physical die has four or more planes, then the MBW capacity may span fewer physical dies, and with the JBW capacity comprising more units of the MBW capacity. In various examples, MBW sizing may also depend on the specific NAND die architecture used in the corresponding NVM.

For a given large data file from host 190, a mapping table is defined for every such MBW/JBW at the FTL level by specifying the MBW/JBW-sized subfiles of that data file. In other words, a large data file is logically partitioned into MBW (or JBW) subfiles, with the corresponding L2P mappings stored in the controller memory. For any subfile that is smaller than the MBW or JBW capacity, a plurality of such smaller subfiles from different original data files can be combined to form a "virtual" subfile that fills up the MBW or JBW capacity. In some examples, to maintain an acceptable level of performance, such virtual subfiles are written to a memory partition having SLCs therein. When concurrent operations (e.g., including RMW operations) are needed for two or more host files associated with a virtual subfile, the SLC partition is typically more conducive to being able to efficiently handle concurrent operations. Data storage device 102 further operates to generate L2P mappings for various MBW (or JBW) subfiles of large data files and store the generated mappings in L2P table 160 and/or in a supplemental subfile mapping table (e.g., 300, FIG. 3) linked with the L2P table 160.

FIG. 3 is a block diagram illustrating an example subfile mapping table 300 according to an embodiment. For illustration purposes and without any implied limitations, only a portion of the table 300 corresponding to two host files is explicitly shown in FIG. 3. The host file identifiers (IDs) of those two files are listed in column 302 of table 300. The first host file has the host file ID=0 and the size of 1936 K B. The second host file has the host file ID=1 and the size of 1136 KB. The first host file (host file ID=0) is segregated into three subfiles having the subfile IDs 0, 1, and 2, respectively, which are listed in column 304 of table 300. The sizes of those three subfiles are 768, 768, and 400 KB, respectively, which are listed in column 306 of the table 300. The second host file (host file ID=1) is segregated into two subfiles having the subfile IDs 0 and 1, respectively, which are listed in column 304 of the table 300. The sizes of those two subfiles are 368 and 768 KB, respectively, which are listed in column 306 of the table 300.

The example table 300 shown in FIG. 3 is an MBW mapping table, with the corresponding attributes of the MBW mapping being specified in columns 308-316 of the table. Based on the provided description, a person of ordinary skill in the pertinent art will be able to make and use a similar JBW mapping table without any undue experimentation. In the example shown, the columns 308, 310, 312, 314, and 316 list MBW IDs, MBW offsets, MBW physical addresses, MBW cell types, and MBW logical die IDs, respectively. Note that the subfiles having the (Host File ID, Subfile ID) values of (0, 2) and (1, 0) form a virtual MBW subfile. The size of the virtual subfile is 768 KB (=400 KB+368 KB). The two portions of that virtual MBW subfile are located at different respective MBW offsets of 0 and 100, respectively, as specified in MBW offset column 310. The corresponding MBW physical address of the two portions is the same, i.e., 100 h, as specified in the MBW physical address column 312. Also note that the virtual MBW subfile is located in an SLC partition for the above-indicated reasons, whereas the other listed MBW subfiles are located in TLC partitions. The logical dies with SLCs therein have the MBW logical die IDs=8, 9, 10, and 11, as specified in column 316 of table 300. The logical dies with TLCs therein have the MBW logical die IDs=0, 1, 2, 3, 4, 5, 6, 7, 12, 13, 14, and 15, as further specified in column 316 of table 300.

During an RMW operation, the data corresponding to an MBW can be changed in a portion thereof having any size between the read/write granularity (which is 4 KB in the above example) and the full MBW capacity (which is 768 KB in the above example). In one example, data storage device 102 is configured to perform data modifications using a data buffer physically located, e.g., in DRAM 150 or in an internal RAM of controller 110. Thus, the corresponding portion of the data buffer is at least 768 KB in size. In another example, data storage device 102 is configured to perform data modifications using a host memory buffer (HMB) located in host 190. Once the corresponding portion of the RAM is full or another request for using the same RAM resource has come in, MBW relocation can take place as part of an RMW operation. The latter relocation can be implemented, e.g., using a regular relocation thread of data storage device 102. It should also be noted that, when multiple MBWs are undergoing RMW operations at substantially the same time, the corresponding relocations can be such that a new (i.e., the relocation target) MBW may be configured to contain multiple 4 KB units from several original (i.e., the relocation source) MBWs. In such cases, the corresponding subfile mapping table, such as table 300, is updated accordingly, e.g., similar to the table updates performed for the write operations initiated by host 190.

Figure 4:
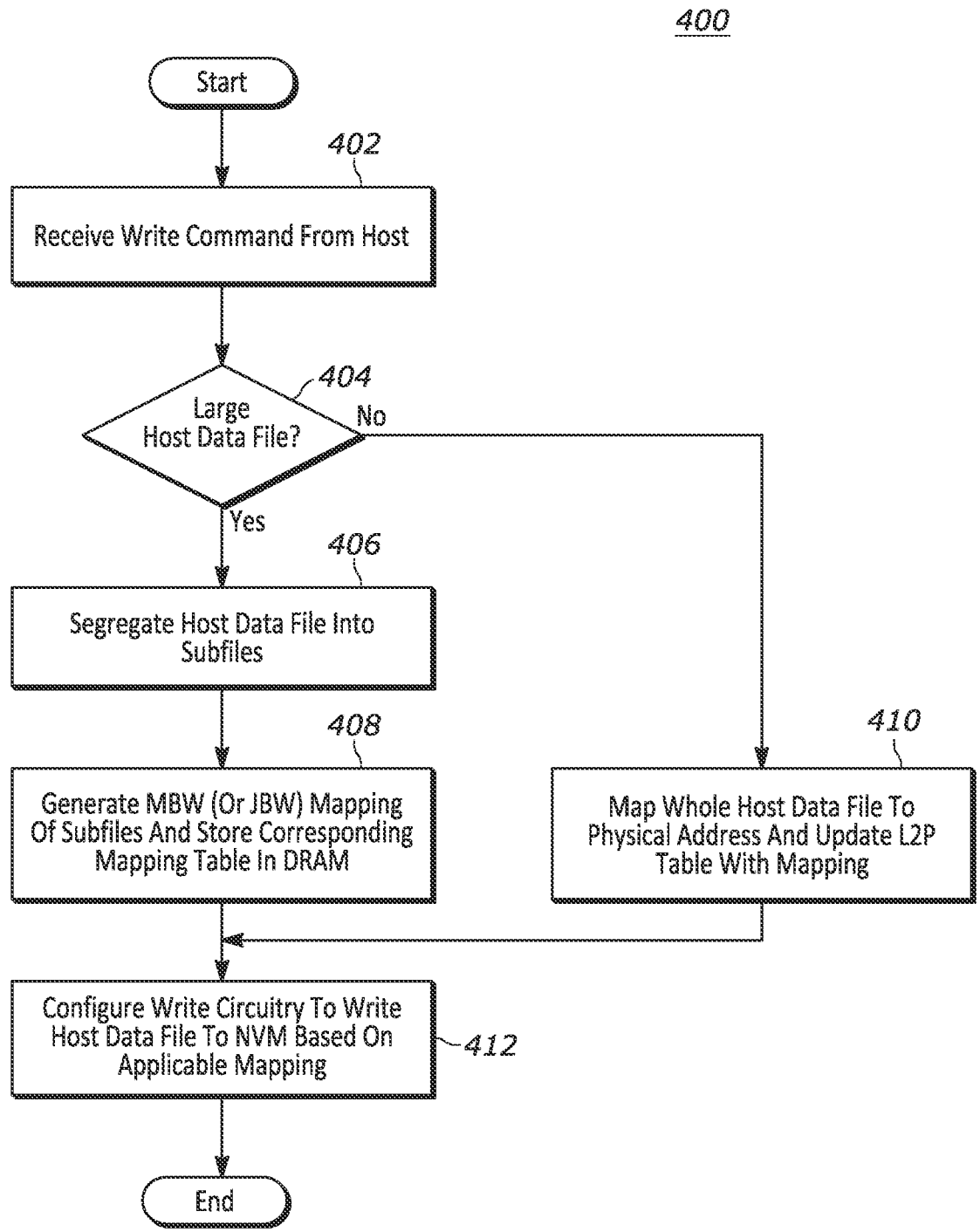
FIG. 4 is a flowchart illustrating a host write operation performed in the data-storage system of FIG. 1 according to an embodiment.

FIG. 4 is a flowchart illustrating a method 400 of performing a host write operation in data storage device 102 according to an embodiment. Method 400 includes the controller 110 receiving a write command from host 190 (in block 402). The received write command specifies, inter alia, the size of the data file to be written to NVM 130.

Method 400 also includes the controller 110 determining whether the data file to be written to NVM 130 is a "large" data file (in decision block 404). In one embodiment, such determination in decision block 404 is made by comparing the file size with the MBW capacity, which is 768 KB in the above example. In another embodiment, such determination in decision block 404 is made by comparing the file size with the JBW capacity, which is 1536 KB in the above example.

When the file size is larger than the MBW (or JBW) capacity ("Yes" at decision block 404), method 400 includes the controller 110 segregating the data file into a plurality of subfiles (in block 406). The plurality of subfiles includes one or more subfiles of a size equal to the MBW (or JBW) capacity. For some data files, the plurality of subfiles also includes at least one subfile of a size smaller than the MBW (or JBW) capacity. As already indicated above, the smaller subfiles from different host data files can be used to form a virtual subfile that fills the corresponding MBW or JBW to capacity.

Method 400 also includes the controller 110 generating an MBW (or JBW) mapping of the subfiles defined in block 406 and further includes the controller 110 generating an MBW (or JBW) mapping table detailing the generated MBW (or JBW) mapping (in block 408). In some examples, the generated MBW mapping table is similar to table 300 (FIG. 3). Method 400 also includes the controller 110 storing the generated MBW (or JBW) mapping table in DRAM 150 (in block 408).

When the file size is smaller than or equal to the MBW (or JBW) capacity ("No" at decision block 404), method 400 includes the controller 110 mapping the whole host data file to a physical address in NVM 130 (in block 410). Method 400 also includes the controller 110 updating L2P table 160 in DRAM 150 to store therein the generated mapping (in block 410).

Method 400 also includes the controller 110 configuring the corresponding write circuitry of data storage device 102 to write the host data file to NVM 130 based on the applicable mapping (in block 412). When the operations preceding block 412 are the operations of block 408, the applicable mapping is the corresponding MBW (or JBW) mapping. When the operations preceding block 412 are the operations of block 410, the applicable mapping is the corresponding conventional L2P mapping.

Figure 5:
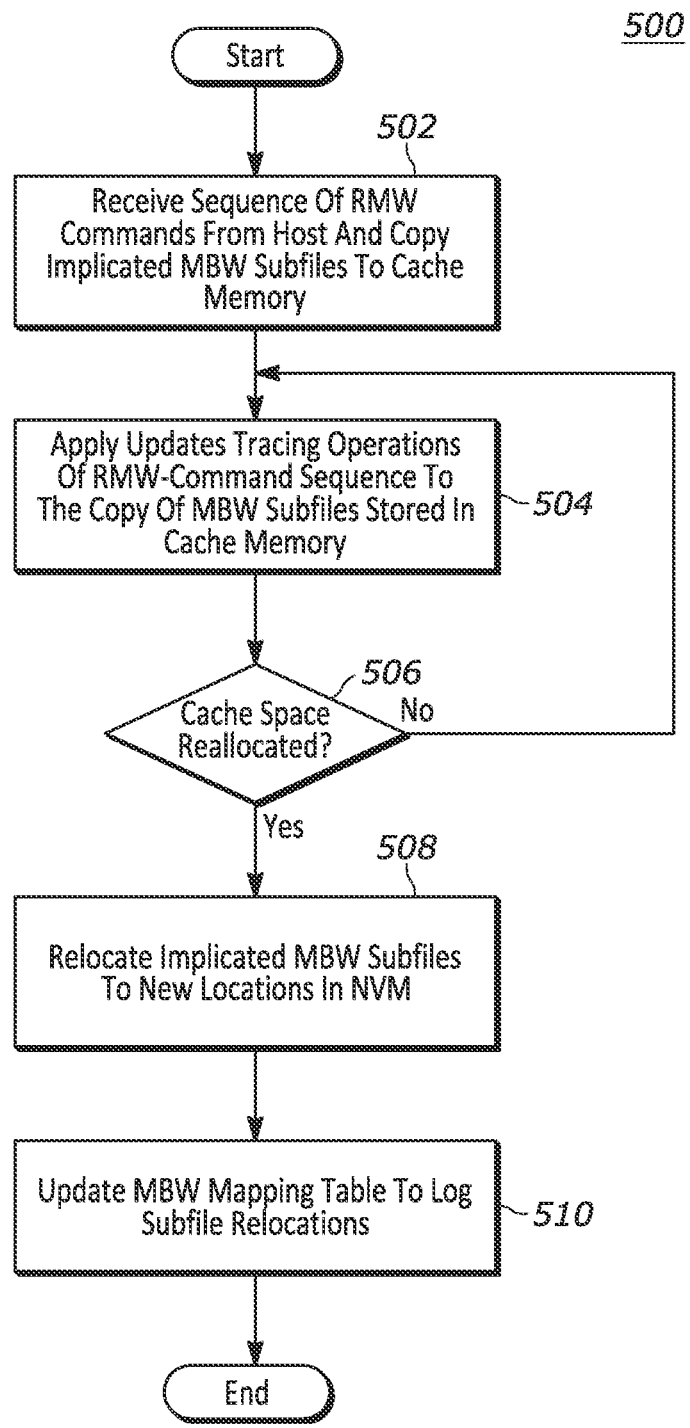
FIG. 5 is a flowchart illustrating read-modify-write operations performed in the data-storage system of FIG. 1 according to an embodiment.

FIG. 5 is a flowchart illustrating a method 500 of performing RMW operations in data storage device 102 according to an embodiment. In some examples, method 500 can be used, e.g., after method 400 (FIG. 4), wherein a large host data file is segregated into subfiles, with the corresponding MBW (or JBW) mapping specified in table 300 or a functionally similar table. For illustration purposes and without any implied limitations, method 500 is described below in reference to MBW subfiles.

Method 500 includes the controller 110 receiving a sequence of RMW commands from host 190 for a data file stored in NVM 130 and copying one or more implicated MBW subfiles from NVM 130 to a data buffer (in block 502). For the above-described specific example, the data-buffer space allocated to each of the copied MBW subfiles is at least 768 KB. Method 500 also includes applying updates tracing the RMW operations of the RMW-command sequence to the copy of the MBW subfiles in the data buffer (in block 504). The RMW operations of the sequence are not applied in block 504 to the source MBW subfiles stored in NVM 130.

Method 500 also includes determining (in decision block 506) whether or not the data buffer space allocated to the copy of the MBW subfiles is to be re-allocated for a different purpose. In a representative example, such reallocations are governed by the applicable buffer-management policies. When it is determined that the re-allocation is not yet coming ("No" in decision block 506), the processing of method 500 is looped back to continue performing operations of block 504. Otherwise ("Yes" in decision block 506), the processing of method 500 is advanced forward to perform operations of block 508.

Method 500 includes operations directed at relocating the implicated MBW subfiles to new respective MBW-sized locations in NVM 130 (in block 508). In one example, controller 110 configures the corresponding write circuitry of data storage device 102 to write a current copy (i.e., a copy updated via operations of block 504) of an MBW subfile stored in the data buffer to a new MBW-sized location in NVM 130. The controller 110 may also mark the data of that MBW subfile stored in the previous location in NVM 130 as invalid. In some examples, the controller 110 may also generate a new virtual MBW subfile, wherein the constituent smaller subfiles are from a set of host data files that is different from the set of host data files in the corresponding previous virtual MBW subfile.

Method 500 also includes the controller 110 updating the MBW mapping table (in block 510). More specifically, the controller 110 operates (in block 510) to perform updates of the MBW mapping table to log therein the MBW subfile mapping changes corresponding to the operations performed in block 508 of method 500. For example, in table 300 shown in FIG. 3, the table entries for the MBW subfiles having the (Host File ID, Subfile ID) values of (0, 0) and (0, 1) will be updated in block 510 to change the respective old MBW physical addresses listed in column 312 of table 300 to the new respective MBW physical addresses when those MBW subfiles are relocated in NVM 130 due to operations performed in block 508 of method 500. Other entries in table 300 may also be appropriately updated to reflect the corresponding operations performed in block 508 of method 500.

FIGS. 6-9 are block diagrams illustrating data layouts in jumbo block 204 according to various examples. Different data layouts can be produced, e.g., with different respective scheduling algorithms used to implement operations in blocks 408 and 410 of method 400. In the notation used in FIGS. 6-9, "JPC $N_1$-$N_2$" denotes WL-block-sized portions of JBW subfiles, wherein the number $N_1$ is the JBW-subfile identifier, and the number $N_2$ is the subfile-portion identifier. An example WL block is block 210 shown in FIG. 2. JBW subfiles are mapped to respective portions of jumbo block 204 using operations of block 408 of method 400. "Normal" denotes a WL block containing data of "small" files mapped thereto using operations of block 410 of method 400.

FIG. 6 illustrates an example data layout produced with forced ordering. In a representative example, forced ordering is used to ensure that the data are laid down evenly and orderly across jumbo block 204 such that host or garbage collection writes are not interleaved with JBW-subfile writes. In the example of FIG. 6, forced ordering results in: (i) three JBW subfiles having been written to word lines WL0, WL1, and WL2, respectively, and (ii) conventional writes having been written to word lines WL3, WL4, and WL5. In one example, forced ordering is achieved by placing a higher priority on writing JBW subfiles and selecting a priority threshold such as to prevent conventional writes from being interleaved with JBW-subfile writes. Additionally, dies can be prevented from getting ahead of one another in terms of the programmed volume by setting the value of allowances for how far a die can be ahead of another die to exactly zero.

FIG. 7 illustrates another example data layout resulting from conventional host or garbage collection writes being allowed to interleave with JBW-subfile writes. In the example of FIG. 7, the interleaving of such writes results in: (i) three JBW subfiles having been written to word lines WL0, WL2, and WL5, respectively, and (ii) conventional writes having been written to word lines WL1, WL3, WL4, and WL6. In some examples, correlated parallelism and ordering among different dies can still be enforced in a manner similar to that used in the example of FIG. 6 so that there is little or no detrimental impact of the interleaving on the performance. Breaks between JBW-subfile writes are provided to accommodate the queued conventional writes and/or other activity.

FIG. 8 illustrates yet another example data layout resulting from writes being scheduled in the first in/first out (FIFO) order of WL blocks. In the example of FIG. 8, the FIFO scheduling results in each of the three JBW subfiles having respective portions thereof on two different word lines. More specifically, the WL blocks JPC0-$N_2$ (where $N_2=0, 1, \ldots, 31$) of the first ($N_1=0$) JBW subfile are spread over word lines WL0 and WL1. The WL blocks JPC1-$N_2$ (where $N_2=0, 1, \ldots, 31$) of the second ($N_1=1$) JBW subfile are spread over word lines WL1 and WL2. The WL blocks JPC2-$N_2$ (where $N_2=0, 1, \ldots, 31$) of the third ($N_1=2$) JBW subfile are spread over word lines WL2 and WL3. Even with such spread, the level of parallelism can typically be relatively high. Relatively more-favorable data layouts can be achieved by doing this type of FIFO scheduling during periods of relatively low activity. With not allowing any die to program further than other dies and/or prioritization of JPC writes, the occurrence of the data layout pattern illustrated in FIG. 8 is made more likely.

FIG. 9 illustrates yet another example data layout resulting from FIFO scheduling wherein some dies are allowed to program further than other dies, and the system is relatively busy with mixed workloads. In the example of FIG. 9, such scheduling results in: (i) the logical dies 1, 3, 5, and 7 having been programmed down to WL3; (ii) the logical dies 0 and 6 having been programmed down to WL4; and (iii) the logical dies 2 and 4 having been programmed down to WL5.

In some examples, for power-loss safety and/or performance enhancement, an update of a small portion of a JBW subfile is scheduled to be done first, which then triggers a corresponding rewrite of a larger data segment at a later time to improve the level of parallelism. In such examples, the following example sequence of events may occur:
  (a) Host 190 issues a write command for a 4-KB page;
  (b) Controller 110 looks up the 4-KB page in L2P table 160 and/or subfile mapping table 300 and determines that the 4-KB page is in a JBL subfile;
  (c) Controller 110 configures the write circuitry to update the 4-KB page in NVM 130;
  (d) Controller 110 reports the completion of the write command to host 190;
  (e) Controller 110 schedules the corresponding update of the JBL subfile having the updated 4-KB page; and
  (f) Controller 110 configures the write circuitry to perform the JBL subfile update in the background, e.g., when workload permits, and the write circuitry relocates the JBL subfile to achieve a more favorable data layout from the parallelism viewpoint, e.g., similar to the data layout illustrated in FIG. 6.

In some examples, an update can happen in two stages, wherein the first stage is a write of the piece of data being modified by the host to a nonvolatile memory (which is a safe option against power loss and relatively easy to implement for enhanced performance), and wherein the second stage is a write to a more permanent location with the entire chunk of the data being handled. The two-stage update is also expected to work well with coalescing, e.g., with multiple modifications being grouped together and updated in a single action, which can be beneficial in terms of performance and write amplification.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations and should in no way be construed to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

Unless explicitly stated otherwise, each numerical value and range should be interpreted as being approximate as if the word "about" or "approximately" preceded the value or range.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

"SUMMARY" in this specification is intended to introduce some example embodiments, with additional embodiments being described in "DETAILED DESCRIPTION" and/or in reference to one or more drawings. "SUMMARY" is not intended to identify essential elements or features of the claimed subject matter, nor is it intended to limit the scope of the claimed subject matter.

"ABSTRACT" is provided to allow the reader to quickly ascertain the nature of the technical disclosure. It is submitted with the understanding that it will not be used to interpret or limit the scope or meaning of the claims. In addition, in the foregoing "DETAILED DESCRIPTION," it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into "DETAILED DESCRIPTION," with each claim standing on its own as a separately claimed subject matter.

What is claimed is:

1. A data storage device, comprising:
a nonvolatile memory to store data;
a second memory to store a logical-to-physical (L2P) table and a subfile mapping table; and
a controller coupled to the nonvolatile memory and the second memory and configured to:
in response to a host command to write a large data file to the nonvolatile memory, segregate the large data file into a plurality of subfiles, the large data file having a file size larger than a first fixed size, each subfile of the plurality of subfiles having a respective size smaller than or equal to the first fixed size;
store a first mapping of the plurality of subfiles in the subfile mapping table, the first mapping including, for each subfile of the plurality of subfiles, a respective word-line physical address;
cause the plurality of subfiles to be written to the nonvolatile memory based on the first mapping; and
access the L2P table and the subfile mapping table to control a memory operation on the large data file in the nonvolatile memory,
wherein, in response to a sequence of host read-modify-write (RMW) commands, the controller is further configured to:
generate a copy of one or more implicated subfiles of the plurality of subfiles in a data buffer;
apply subfile updates corresponding to the sequence of host RMW commands to the copy; and
in response to re-allocation of the data buffer, cause relocation of the one or more implicated subfiles in the nonvolatile memory.

2. The data storage device of claim 1, wherein the first fixed size is a meta-block word-line capacity or a jumbo-block word-line capacity, the jumbo-block word-line capacity being an integer multiple of the meta-block word-line capacity, the meta-block word-line capacity being a combined data capacity of NAND memory blocks connected to a same word line in a single physical die of the nonvolatile memory or an integer multiple of said combined data capacity in one or more physical dies of the nonvolatile memory.

3. The data storage device of claim 1, wherein the controller is further configured to:
in response to a host command to write a small data file to the nonvolatile memory, store a mapping of the small data file in the L2P table, the small data file having a file size smaller than the first fixed size; and
cause the small data file to be written to the nonvolatile memory based on said mapping of the small data file.

4. The data storage device of claim 3, wherein the first mapping causes the plurality of subfiles to be interleaved with a plurality of small data files in the nonvolatile memory.

5. The data storage device of claim 1, wherein the controller is further configured to update the first mapping in the subfile mapping table in accordance with the relocation.

6. The data storage device of claim 1, wherein the controller is configured not to apply the subfile updates corresponding to the sequence of host RMW commands to the one or more implicated subfiles in the nonvolatile memory until the relocation.

7. The data storage device of claim 1, wherein the first mapping causes an individual subfile of the plurality of subfile to occupy, in the nonvolatile memory, an array of NAND memory blocks connected to a single word line in a single physical die of the nonvolatile memory or two or more instances of said array in one or more physical dies of the nonvolatile memory.

8. The data storage device of claim 7,
wherein at least one NAND memory block in the array of NAND memory blocks has stored therein both a smaller subfile of a first large data file and a smaller subfile of a second large data file; and
wherein the smaller subfile of the first large data file and the smaller subfile of a second large data file have a combine size equal to the first fixed size.

9. The data storage device of claim 1, wherein the first mapping causes an individual subfile of the plurality of subfiles to occupy, in the nonvolatile memory, a first array of NAND memory blocks connected to a first word line in a physical die of the nonvolatile memory and a second array of NAND memory blocks connected to a second word line in the physical die of the nonvolatile memory.

10. The data storage device of claim 1, wherein the first mapping causes the plurality of subfiles to be interleaved with a plurality of other data files or other subfiles in the nonvolatile memory.

11. A method performed by a data storage device, the method comprising:
in response to a host command to write a large data file to a nonvolatile memory, segregating, via a controller, the large data file into a plurality of subfiles, the large data file having a file size larger than a first fixed size, each subfile of the plurality of subfiles having a respective size smaller than or equal to the first fixed size;
storing, via the controller, a first mapping of the plurality of subfiles in a subfile mapping table, the first mapping including, for each subfile of the plurality of subfiles, a respective word-line physical address;
causing, via the controller, the plurality of subfiles to be written to the nonvolatile memory based on the first mapping;
accessing, via the controller, a logical-to-physical (L2P) table and the subfile mapping table to control a memory operation on the large data file in the nonvolatile memory;
receiving, via the controller, a sequence of host read-modify-write (RMW) commands;
generating, via the controller, a copy of one or more implicated subfiles of the plurality of subfiles in a data buffer, the one or more implicated subfiles being implicated by the sequence of host RMW commands;
applying, via the controller, subfile updates corresponding to the sequence of host RMW commands to the copy; and
in response to re-allocation of the data buffer, causing, via the controller, relocation of the one or more implicated subfiles in the nonvolatile memory.

12. The method of claim 11, wherein the first fixed size is a meta-block word-line capacity or a jumbo-block word-line capacity, the jumbo-block word-line capacity being an integer multiple of the meta-block word-line capacity, the meta-block word-line capacity being a combined data capacity of NAND memory blocks connected to a same word line in a single physical die of the nonvolatile memory.

13. The method of claim 11, further comprising:
in response to a host command to write a small data file to the nonvolatile memory, storing, via the controller, a mapping of the small data file in the L2P table, the small data file having a file size smaller than the first fixed size; and
causing, via the controller, the small data file to be written to the nonvolatile memory based on said mapping of the small data file.

14. The method of claim 11, wherein the controller is configured to update the first mapping in the subfile mapping table in accordance with the relocation.

15. The method of claim 11, wherein the controller is configured not to apply the subfile updates corresponding to the sequence of host RMW commands to the one or more implicated subfiles in the nonvolatile memory until the relocation.

16. The method of claim 11, wherein the first mapping causes an individual subfile of the plurality of subfiles to occupy, in the nonvolatile memory, a first array of NAND memory blocks connected to a first word line in a physical die of the nonvolatile memory and a second array of NAND memory blocks connected to a second word line in the physical die of the nonvolatile memory.

17. A data storage device, comprising:
means for segregating a large data file into a plurality of subfiles in response to a host command to write the large data file to a nonvolatile memory, the large data file having a file size larger than a first fixed size, each subfile of the plurality of subfiles having a respective size smaller than or equal to the first fixed size;
means for storing a first mapping of the plurality of subfiles in a subfile mapping table, the first mapping including, for each subfile of the plurality of subfiles, a respective word-line physical address;
means for causing the plurality of subfiles to be written to the nonvolatile memory based on the first mapping;
means for accessing a logical-to-physical (L2P) table and the subfile mapping table to control a memory operation on the large data file in the nonvolatile memory;
means for receiving a sequence of host read-modify-write (RMW) commands;
means for generating a copy of one or more implicated subfiles of the plurality of subfiles in a data buffer, the one or more implicated subfiles being implicated by the sequence of host RMW commands;
means for applying subfile updates corresponding to the sequence of host RMW commands to the copy; and
means for causing relocation of the one or more implicated subfiles in the nonvolatile memory in response to re-allocation of the data buffer.

* * * * *